Dec. 21, 1954     J. H. DIEHL     2,697,321
CORN HARVESTER ANTICLOGGING MEANS
Filed March 27, 1952
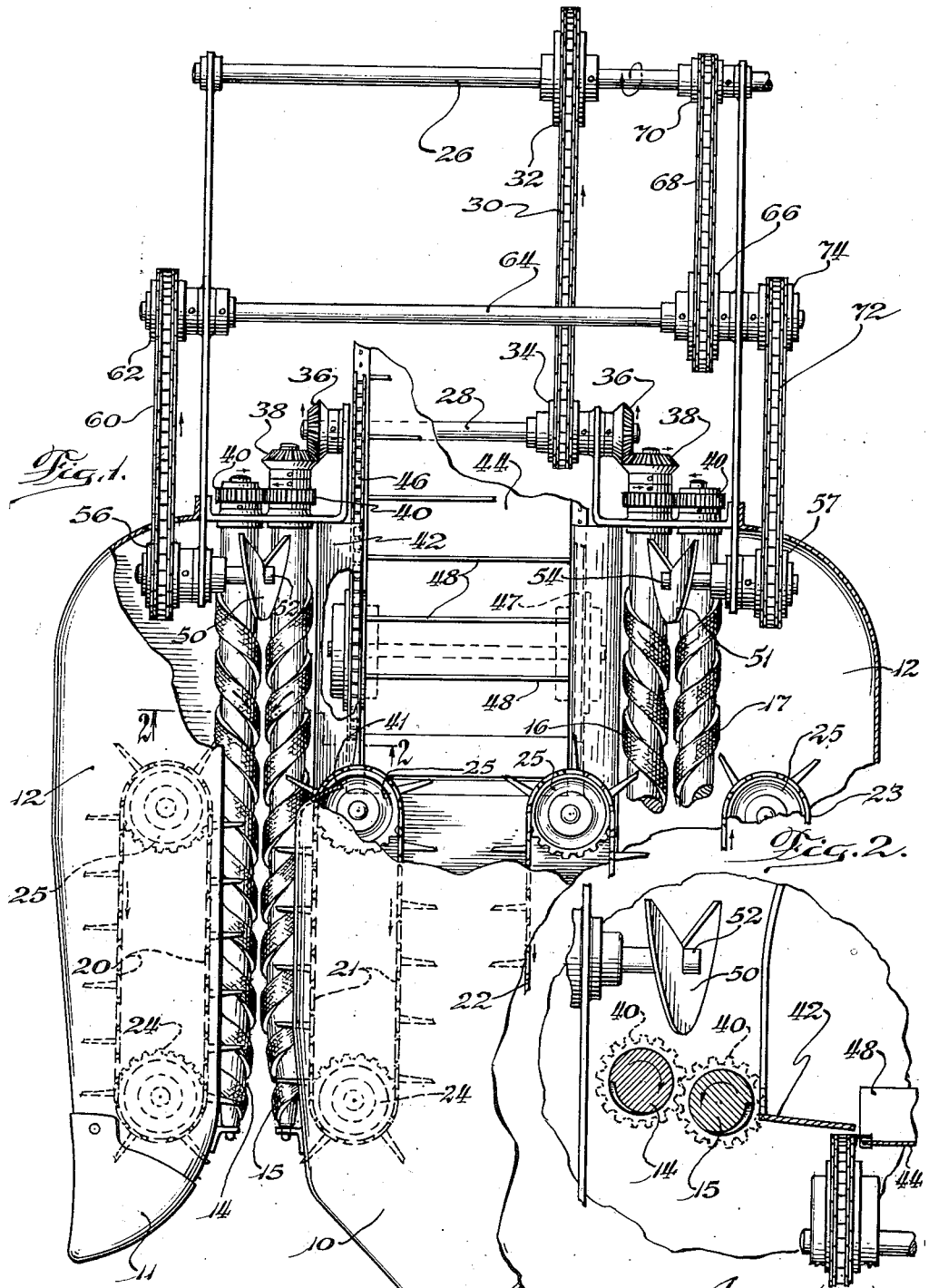

United States Patent Office 2,697,321
Patented Dec. 21, 1954

2,697,321

CORN HARVESTER ANTICLOGGING MEANS

Joseph H. Diehl, Batavia, Ill.

Application March 27, 1952, Serial No. 278,826

1 Claim. (Cl. 56—107)

My invention relates generally to corn pickers, and more particularly to means for preventing clogging of corn stalks and ears at the upper ends of the snapping rollers.

In the use of corn pickers and harvesters, ears of corn occasionally fail to be snapped from the stalk as soon as the ears are engaged by the snapping rollers, as they should, but are conveyed upwardly and rearwardly by the rapidly revolving snapping rollers which thus fail to perform their intended function. Instead, the snapping rollers act as a pair of screw conveyors, carrying the ears and stalks to the upper and rearward end of the trough above the snapping rollers, where they accumulate in the manner of a log jam. Because the picker is usually driven down the rows of corn at a speed in the order of three miles per hour, and since the snapping rollers rotate in opposite directions at a speed of approximately 500 R. P. M., this accumulation of ears, stalks, husks, and leaves above the upper ends of the snapping rollers takes place rapidly. This occurs whenever even a small percentage (1% to 5%) of the ears are so firmly joined to the stalks that they are not pulled therefrom by the snapping rollers.

The failure of the snapping rollers to sever the ears from the stalk as soon as the ears are engaged by the rollers, occurs most frequently when the stalks are dry and thus brittle, under which conditions the snapping rollers do not obtain a good grip or bite on the stalk and the stalk is therefore not pulled down between the rollers in the intended manner, but is conveyed upwardly and rearwardly.

It is a difficult and time-consuming operation to stop the machine and pull out the ears and stalks which have collected in a jam, and the machine operator is therefore temped to endeavor to break the jam while the machine is in motion, because when the machine is operating it will dispose of the stalks and refuse, provided the ears are broken from the stalks. The tendency of the farmer is therefore to reach into the jam and pull the ears from the stalks while the machine is operating. Many thousands of accidents have occurred, resulting in the loss of fingers, hands, and arms due to the fact that the operator, in endeavoring to clear the jam, gets his fingers in the spaces between the rapidly rotating snapping rollers, whereupon the fingers are gripped by the rollers and pulled downwardly, with the result of mangling and maiming the operator's fingers, hands, and even in some instances, his arm.

It is therefore a primary object of the invention to provide an improved safety means for preventing the clogging or jamming of stalks and ears at the upper and rearward ends of the snapping rollers.

A further object is to provide an improved corn picker or harvester in which means for agitating ears of corn and stalks are provided near the upper end of the troughs above the snapping rollers.

Other objects will become apparent from the following description, reference being had to the accompanying drawings, in which:

Fig. 1 is a fragmentary sectional view of the front portion of a corn picker, viewed from a direction perpendicular to the axis of the snapping rollers; and Fig. 2 is an enlarged fragmentary sectional view, showing one of the agitators.

Except for the provision of the novel agitators and the drive therefor, the corn picker disclosed herein is of known construction, the picker shown being of the type capable of harvesting two rows of corn at a time. It comprises a central housing 10 and a pair of divider points 11 on side housings 12 which form means to provide troughs above pairs of snapping rollers 14, 15, and 16, 17, and also to house gathering chain conveyors 20, 21, 22, 23, meshing with suitable idler sprockets 24 and driving sprockets 25. These gathering chains may be driven from the engine through any suitable chain or gear drive.

A main drive shaft 26 is connected to a suitable source of power, such as the engine of the tractor (not shown) used to haul the corn picker. The main shaft 26 drives a countershaft 28 through a chain 30 which meshes with a sprocket 32 on main shaft 26 and with a sprocket 34 on the countershaft. These shafts are suitably journaled in the frame of the machine, the countershaft 28 having bevel gears 36 keyed or pinned to it at its ends. These bevel gears mesh with bevel pinions 38 secured respectively to the upper ends of snapping rollers 15 and 16. The latter snapping rollers drive the other rollers through intermeshing gears 40, so that the rollers of a pair are driven in opposite directions, normally at a speed of about 500 R. P. M.

It will be noted that the outer rollers 14 and 17 are slightly above the inner rollers 15 and 16, and that the sides of the housing 10, adjacent the upper portions of the snapping rollers, have openings 41 to permit ears of corn which are snapped from the stalks to fall or slide past narrow sloping shelves 42 on to the pan 44 of a suitably driven rake-type elevator. This elevator comprises a pair of endless chains 46 and 47 connected by slats 48 which elevate the ears of corn to the sheller or husker.

As previously indicated, sometimes some of the ears of corn fail to be snapped from the stalks adjacent the openings 41, and instead collect and clog at the upper ends of the troughs above the snapping rollers. At these places where the clogging or jamming tends to take place, I have provided agitators 50 and 51, secured respectively to stub shafts 52 and 54, the latter being suitably journaled in the frame of the machine and at their outer ends have sprockets 56 and 57 secured thereto.

The agitators 50 and 51 may be in the form of discs having their peripheral edges in helical form. For example, to make these agitators, a circular sheet steel disc may have a narrow radial slot and a central shaft hole cut therein. Before or after being welded to its stub shaft, it is warped to provide a substantially helical peripheral edge. The agitators may be driven by any suitable gear train, or by belts, but as shown the agitator 50 is driven through a roller chain 60 meshing with a sprocket 62 on a countershaft 64 which is suitably journaled in the frame of the machine, and the latter shaft carries a sprocket 66 which is driven from shaft 26 through a chain 68 meshing with a sprocket 70 secured to the shaft 26. The agitator 51 is similarly driven through a chain 72 and sprocket 74 on the countershaft 64.

The size of the sprockets and the speed of the drive shaft 26 are such that the agitators 50 and 51 are driven at a speed of approximately 100 R. P. M. It will be observed that they are driven in the same direction, but that they are of opposite pitch so that both tend to bend the stalk toward the center of the machine, break loose the ears, and push them toward the rake elevator pan 44. The leading radial edges of the agitators may strike the ears of corn and twist them from the stalks so that the snapping rollers may drag the stalk downwardly between them. Furthermore, any leaves, husks, or stalk portions which have been carried upwardly to the ends of the troughs above the snapping rollers are thrown away from the rollers, and thus are thrown clear of the machine or to a new position where the snapping rollers may take hold and drag the debris between them and drop it on the ground.

The agitators 50 and 51 are made of the warped shape described so that they will break the ears of corn from the stalks with a sideward twisting action if the ears do not happen to have previously been engaged by the leading edges of the agitators and thus torn loose from the stalks.

It is less necessary to use husking pegs or set screws on the snapping rollers of corn pickers equipped with the improved agitators.

By preventing clogging or jamming of the ears of corn at the upper ends of the snapping rollers, the agitators 50 and 51, quickly severing the ears from the stalk, reduce the possibility of having the ears shelled by the snapping rollers. The snapping rollers and their bearings will have a longer useful life because of the elimination of the formation of clogs or jams. The harvesting of corn is done in a shorter time because of the fact that it is not necessary to stop at frequent intervals to remove the ears, stalks, and husks which otherwise would have formed a jam at the upper end of the snapping rollers, clogging the machine, making it essential to stop.

Although the agitators are herein disclosed in the form of warped discs, they may assume a variety of forms, the essential characteristic being that the agitators should be so formed and rotated at such speed as to engage the ears near the snapping rollers and gently twist them loose from the stalk so that they may fall into the pan of the rake elevator.

While I have shown and described a preferred embodiment of my invention, it will be apparent that numerous variations and modifications thereof may be made without departing from the underlying principles of the invention. I therefore desire, by the following claim, to include within the scope of the invention all such variations and modifications by which substantially the results of my invention may be obtained through the use of substantially the same or equivalent means.

I claim:

In a corn picker of the type having rotary inclined snapping rollers with upper terminal portions, the combination of a horizontal rotary shaft positioned above the upper terminal portions of the snapping rollers and having an end projecting transversely of said rollers, and an agitator secured to the end portion of said shaft, said agitator comprising a sheet-like member having a peripheral edge forming one turn of a helix, said agitator being adapted to engage and twist loose an ear of corn which is preventing its attached stalk from being discharged between the snapping rollers beneath the agitator.

References Cited in the file of this patent

UNITED STATES PATENTS

| Number | Name | Date |
|--------|------|------|
| 484,808 | Morral et al. | Oct. 25, 1892 |
| 1,821,985 | Peterson | Sept. 8, 1931 |
| 2,440,791 | Welty | May 4, 1948 |
| 2,542,646 | Fergason | Feb. 20, 1951 |